INVENTOR.
William C. Kuhlman
BY
Roland G. Anderson
ATTORNEY.

May 16, 1967 W. C. KUHLMAN 3,320,098

TUNGSTEN-OSMIUM THERMOCOUPLE AND ELEMENT THEREOF

Filed Feb. 24, 1965 2 Sheets-Sheet 2

INVENTOR.
William C. Kuhlman

BY

Roland A. Anderson

ATTORNEY.

United States Patent Office 3,320,098

Patented May 16, 1967

3,320,098

TUNGSTEN-OSMIUM THERMOCOUPLE AND ELEMENT THEREOF

William C. Kuhlman, Cincinnati, Ohio, assignor to the United States of America as represented by the United States Atomic Energy Commission Filed Feb. 24, 1965, Ser. No. 435,102
3 Claims. (Cl. 136—236)

Figure 1:
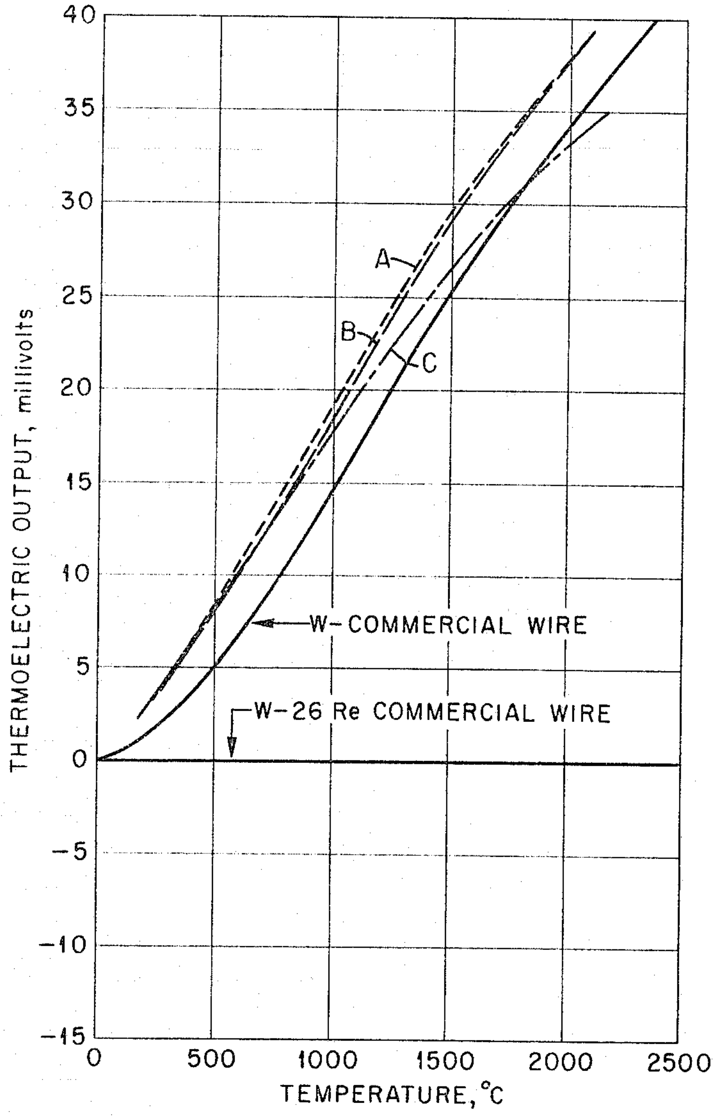

This invention relates to thermocouple materials and more particularly to a thermocouple alloy for use in nuclear environments.

One of the problems involved in measurement of high temperatures such as 1500° C. to 2000° C. in nuclear environments is the provision of radiation-stable thermocouple alloys. The combination most commonly used at these temperatures, tungsten vs. tungsten-26 percent rhenium alloy, undergoes a substantial change in thermoelectric output after prolonged irradiation with thermal neutrons. For example, this combination exhibits a positive error of 85° C. at 1500° C. and a positive error of over 125° C. at 2000° C. after six month's irradiation at a thermal neutron flux of $10^{14}$ *nv*.

The tungsten vs. tungsten-26 percent rhenium alloy combination exhibits other disadvantages unrelated to nuclear effects. The increase in thermoelectric output with increasing temperature deviates significantly from a linear relationship at some temperatures so that accuracy of calibration is decreased. In addition accuracy of the combination is limited by the thermoelectric output at all temperatures, and increased output would result in improved accuracy.

It is therefore an object of this invention to provide a thermocouple alloy having improved resistance to change in thermoelectric properties in a neutron environment.

Another object is to provide a thermocouple alloy which exhibits a linear increase in thermoelectric output with temperature when used in combination with tungsten-26 percent rhenium alloy.

Another object is to provide a thermocouple alloy having a higher thermoelectric output than tungsten at all temperatures when used in combination with tungsten-26 percent rhenium alloy.

Other objects and advantages of this invention will be apparent from the following detailed description and claims.

In accordance with the present invention a thermocouple alloy of the composition 0.5 to 1.0 atom percent osmium and the balance tungsten is provided. This alloy, when used in combination with tungsten-26 percent rhenium alloy, exhibits a substantially decreased error at high temperatures after prolonged exposure to neutron irradiation. The increase in thermoelectric output with temperature is more linear than for tungsten, and the thermoelectric output at all temperatures is increased so that accuracy is substantially improved.

I have found that the addition of 0.5 to 1.0 atom percent osmium minimizes the effect of neutron irradiation on tungsten. Although this invention is not to be understood as limited to a particular theory, it is postulated that the change in output for tungsten after irradiation is due to transmutation of a small amount of the tungsten to rhenium and osmium and that the effect of forming these elements in the tungsten is substantially nullified where osmium is initially provided in the tungsten. The reason for the increased output and improved linearity with temperature are not understood.

An osmium content of about 0.5 to 1.0 atom percent is critical to achievement of the desired properties in the thermocouple alloy. Compositions within this range exhibit nearly the same output as one another so that they are relatively insensitive to changes in output due to small changes in osmium content resulting from nuclear transmutation. At lower osmium levels the alloy would be sensitive to radiation-induced changes, and at higher levels the output deviates substantially from the output of 0.5 to 1.0 osmium alloy.

The tungsten 0.5 to 1.0 atom percent alloy may be employed for thermocouple applications in substantially the same manner as unalloyed tungsten. As may be seen by reference to FIGURE 1 in the drawing, this alloy exhibits a high positive output and a linear increase in output with temperature. It may be used as one leg of a thermocouple in combination with another leg comprising any material having a substantially lower output. Commercially available tungsten-26 percent rhenium, which is depicted as having zero output in the figure, is preferred as the other leg. It is to be understood that the term "tungsten-26 percent rhenium" as used herein is intended to refer to commercially available thermocouple alloy, which is so designated although the rhenium content may vary from 24 to to 26 weight percent. The alloy in the experiments described below actually contained 25 weight percent rhenium.

Fabrication of the tungsten-0.5 to 1.0 atom percent osmium alloy may be effected by blending of tungsten and osmium powders, compressing the powder mixture into billets, sintering and drawing or extruding the billets into wire. Osmium is a highly brittle material, but the relatively small amount used in this alloy does not substantially alter the fabrication properties of tungsten. Conventional methods may be employed in construction and calibration of thermocouple devices utilizing this alloy.

Although the tungsten-0.5 to 1.0 osmium alloy is particularly advantageous for nuclear environments, its use is not to be understood as limited. In general the preferred combination of this alloy with tungsten-26 percent rhenium alloy may be used for the same applications as the previous tungsten vs. tungsten-26 percent rhenium thermocouple.

This invention is further illustrated by the following examples:

EXAMPLE I

The thermoelectric outputs of tungsten-0.5 atom percent osmium, tungsten-1.0 atom percent osmium and tungsten-3.0 atom percent osmium alloys at temperatures from 375° C. to 2100° C. in combination with tungsten-25 weight percent rhenium were determined by the following procedure: A calibrated tungsten versus tungsten-25 weight percent rhenium wire thermocouple junction was fastened to the end of a rod of the tungsten-osmium alloy and the common junction of the three materials was inserted into a high-temperature furnace. The thermoelectric output between the tungsten and tungsten-rhenium alloy was read and the temperature was determined from the previous calibration. The output between the tungsten-osmium rod and the tungsten-rhenium wire was then measured at the same temperature. The results obtained are shown in FIGURE 1 wherein the outputs in millivolts for these alloys in combination with tungsten-25 weight percent rhenium alloy are depicted. Curve A represents the output for the 1.0 atom percent osmium alloy; B, 0.5 atom percent osmium; and C, 3 atom percent osmium. The output for tungsten, previously used in combination with the tungsten-25 weight percent rhenium alloy, is shown for comparison. It may be readily seen that the increase in output with temperature is more linear for the osmium-containing alloys and that substantially higher outputs are obtained at all temperatures. It may also be seen that the outputs for the tungsten 0.5 osmium and tungsten-1.0 osmium alloys were substantially the same at all temperatures, while the output for tungsten-3.0 osmium deviated significantly.

EXAMPLE II

Figure 2:
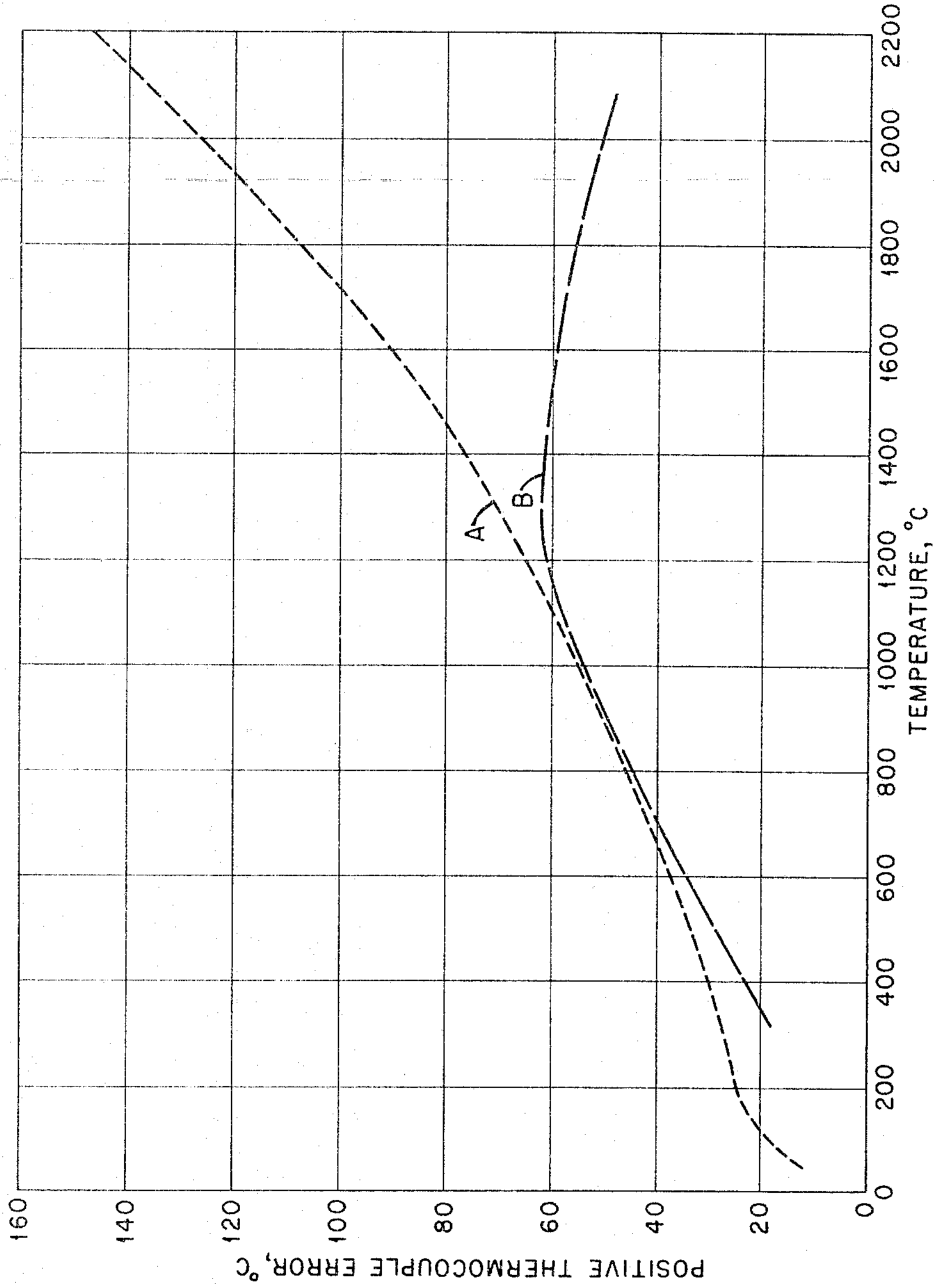

A series of experiments was conducted to compare the effect of neutron irradiation on thermocouple error in tungsten with the effect on tungsten-1.0 atom percent osmium. The error of these materials in combination with tungsten-25 weight percent rhenium after six month's exposure at a neutron flux of $10^{14}$ *nvt* was determined by the following procedure:

An alloy of tungsten, rhenium and osmium was prepared to correspond to the theoretically determined composition of the transmuted alloy obtained by irradiation of unalloyed tungsten to the extent stated above. A second alloy of tungsten, rhenium and osmium was prepared to correspond to the transmuted alloy obtained by irradiation of tungsten-1.0 atom percent osmium alloy to the same extent. A third alloy of tungsten, rhenium and osmium was prepared to correspond to the transmuted alloy obtained by irradiation of tungsten-25 weight percent rhenium alloy. The thermoelectric output for these materials was measured at temperatures from 200° C. to 2200° C. by the procedure of Example I. The error attributable to irradiation was then determined by measuring the output for unirradiated tungsten, tungsten-1.0 atom percent osmium and tungsten-25 weight percent rhenium alloys at the corresponding temperature and subtracting to obtain the difference. The results obtained may be seen by reference to FIGURE 2 in the drawing. Curve A represents the difference in output for tungsten versus tungsten-25 weight percent rhenium and curve B represents the difference for tungsten-1.0 atom percent osmium versus tungsten-25 weight percent rhenium. It may be seen that at temperatures above 1200° C. the radiation-induced error for tungsten increases significantly while the error for tungsten-1.0 percent osmium remains relatively low.

The above examples are merely illustrative and are not to be understood as limiting the scope of my invention, which is limited only as indicated by the appended claims.

Having thus described my invention, I claim:

1. A thermocouple element consisting of 0.5 to 1.0 atom percent osmium and the balance tungsten.

2. A thermocouple comprising a first leg consisting of the composition 0.5 to 1.0 atom percent osmium and the balance tungsten and a second leg consisting of the composition 26 percent rhenium and the balance tungsten.

3. A thermocouple for use in neutron environments comprising a first leg consisting of the composition 0.5 to 1.0 atom percent osmium and the balance tungsten and a second leg consisting of the composition 26 percent rhenium and the balance tungsten.

References Cited by the Examiner

UNITED STATES PATENTS

| | | | |
|---|---|---|---|
| 2,948,766 | 9/1960 | McGrath | 136—36 XR |
| 3,006,978 | 10/1961 | Schneider | 136—236 XR |

OTHER REFERENCES

"Journal of the Less-Common Metals—International Journal on Their Chemistry & Metallurgy," published 1961 by the Elseviev Publishing Co., Amsterdam, Netherlands, pages 333–343.

HYLAND BIZOT, *Primary Examiner.*